(12) United States Patent
Ahmavaara

(10) Patent No.: US 7,920,522 B2
(45) Date of Patent: Apr. 5, 2011

(54) METHOD AND APPARATUS FOR SYSTEM INTEROPERABILITY IN WIRELESS COMMUNICATIONS

(75) Inventor: Kalle I. Ahmavaara, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 646 days.

(21) Appl. No.: 11/863,944

(22) Filed: Sep. 28, 2007

(65) Prior Publication Data

US 2008/0095087 A1    Apr. 24, 2008

Related U.S. Application Data

(60) Provisional application No. 60/848,216, filed on Sep. 29, 2006.

(51) Int. Cl.
*H04W 4/00* (2009.01)
(52) U.S. Cl. .................................. 370/331; 455/436
(58) Field of Classification Search .......... 370/328–329, 370/331, 338; 455/436–439, 442
See application file for complete search history.

(56) References Cited

U.S. PATENT DOCUMENTS

| | | | | |
|---|---|---|---|---|
| 6,708,031 | B2 * | 3/2004 | Purnadi et al. ................ | 455/436 |
| 6,714,784 | B1 * | 3/2004 | Forssell et al. ................ | 455/436 |
| 6,898,433 | B1 * | 5/2005 | Rajaniemi et al. .......... | 455/456.1 |
| 6,968,190 | B1 * | 11/2005 | Suumaki et al. .............. | 455/436 |
| 7,151,931 | B2 * | 12/2006 | Tsao et al. .................. | 455/435.2 |
| 7,239,632 | B2 * | 7/2007 | Kalavade et al. ............ | 370/389 |
| 7,359,347 | B2 * | 4/2008 | Ahmavaara et al. .......... | 370/328 |
| 7,391,754 | B2 * | 6/2008 | Bae et al. .................... | 370/331 |
| 7,440,744 | B2 * | 10/2008 | Muniere et al. .............. | 455/403 |
| 7,496,068 | B2 * | 2/2009 | Chen .......................... | 370/329 |
| 7,586,878 | B2 * | 9/2009 | Hsu et al. .................... | 370/331 |
| 7,668,176 | B2 * | 2/2010 | Chuah ...................... | 370/395.42 |
| 7,818,453 | B2 * | 10/2010 | Haumont et al. ............ | 709/245 |
| 2002/0191575 | A1 * | 12/2002 | Kalavade et al. ............ | 370/338 |
| 2003/0169725 | A1 * | 9/2003 | Ahmavaara et al. ......... | 370/352 |
| 2004/0122977 | A1 * | 6/2004 | Moran et al. ................ | 709/246 |
| 2004/0213179 | A1 * | 10/2004 | Lundin et al. ................ | 370/329 |
| 2005/0130659 | A1 | 6/2005 | Grech et al. | |
| 2005/0174965 | A1 * | 8/2005 | Sarkkinen et al. .......... | 370/329 |

(Continued)

FOREIGN PATENT DOCUMENTS

EP    1322090    6/2003

(Continued)

OTHER PUBLICATIONS

International Search Report-PCT/US2007/080115, International Search Authority-European Patent Office-Apr. 10, 2008.

(Continued)

*Primary Examiner* — Chi H. Pham
*Assistant Examiner* — Kevin Mew
(74) *Attorney, Agent, or Firm* — François A. Pelaez

(57) ABSTRACT

In a method and apparatus for providing system interoperability in wireless communications an IP based client-server application maintains a proper set of PDP contexts while a mobile is connected via an IP based system. The application client resides in the mobile and the server resides within the network at a common anchor point between the IP based system and a PDP contexts based system. The PDP contexts are kept up to date but on hold until a handover occurs for the mobile from the IP based system to the PDP contexts based system.

25 Claims, 3 Drawing Sheets

U.S. PATENT DOCUMENTS

| | | | |
|---|---|---|---|
| 2005/0232148 A1* | 10/2005 | Curcio et al. | 370/230 |
| 2005/0239461 A1 | 10/2005 | Verma et al. | |
| 2006/0104262 A1* | 5/2006 | Kant et al. | 370/352 |
| 2006/0159047 A1 | 7/2006 | Olvera-Hernandez et al. | |
| 2006/0256749 A1* | 11/2006 | Rexhepi et al. | 370/329 |
| 2007/0086359 A1* | 4/2007 | Yaqub | 370/254 |
| 2008/0049662 A1* | 2/2008 | Islam et al. | 370/328 |
| 2010/0246500 A1* | 9/2010 | Rydnell et al. | 370/329 |

FOREIGN PATENT DOCUMENTS

| | | |
|---|---|---|
| EP | 1392077 A1 | 2/2004 |
| EP | 1646189 | 4/2006 |
| RU | 2283542 | 9/2006 |
| WO | WO03101018 | 12/2003 |
| WO | WO2006029663 | 3/2006 |
| WO | 2007092804 | 8/2007 |

OTHER PUBLICATIONS

Written Opinion-PCT/US2007/080115, International Search Authority-European Patent Office-Apr. 10, 2008.

3GPP TS 23.060 v7.1.0 3rd Generation Partnership Project; Technical Specification Group Services and System Aspects; General Packet Radio Service (GPRS); Service description; Stage2 (Release 7)(Jun. 2006).

* cited by examiner

METHOD AND APPARATUS FOR SYSTEM INTEROPERABILITY IN WIRELESS COMMUNICATIONS

CROSS-REFERENCE TO RELATED APPLICATION

This application claims the benefit of U.S. Provisional Application Ser. No. 60/848,216, filed on Sep. 29, 2006, and entitled "METHOD AND APPARATUS FOR SYSTEM INTEROPERABILITY IN WIRELESS COMMUNICATIONS." The entirety of this application is incorporated herein by reference.

BACKGROUND

I. Field

The present invention relates generally to wireless communications, and more specifically to system interoperability in wireless communications.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

There is generally pressure to upgrade communication networks in order to implement new, more advanced technologies. However, this often involves heavy investments, and compatibility issues between equipment and protocols used between the different entities involved. There is therefore a constant need for methods and apparatuses for facilitating communication between these entities.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a method for system interoperability in communication networks, comprises: establishing context information related to activity of a mobile station within a first communication system, wherein said first communication system is not a context based system; keeping said context information up to date; keeping said context information on hold while the mobile station is connected to the first communication system; and puting to use said context information when the mobile station switches to a second communication system, wherein said second communication system is a context based communication system.

In another aspect an apparatus for system interoperability in communication networks, comprises: means for establishing context information related to activity of a mobile station within a first communication system, wherein said first communication system is not a context based system; means for keeping said context information up to date; means for keeping said context information on hold while the mobile station is connected to the first communication system; and means for puting to use said context information when the mobile station switches to a second communication system, wherein said second communication system is a context based communication system.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

DETAILED DESCRIPTION

Figure 1:
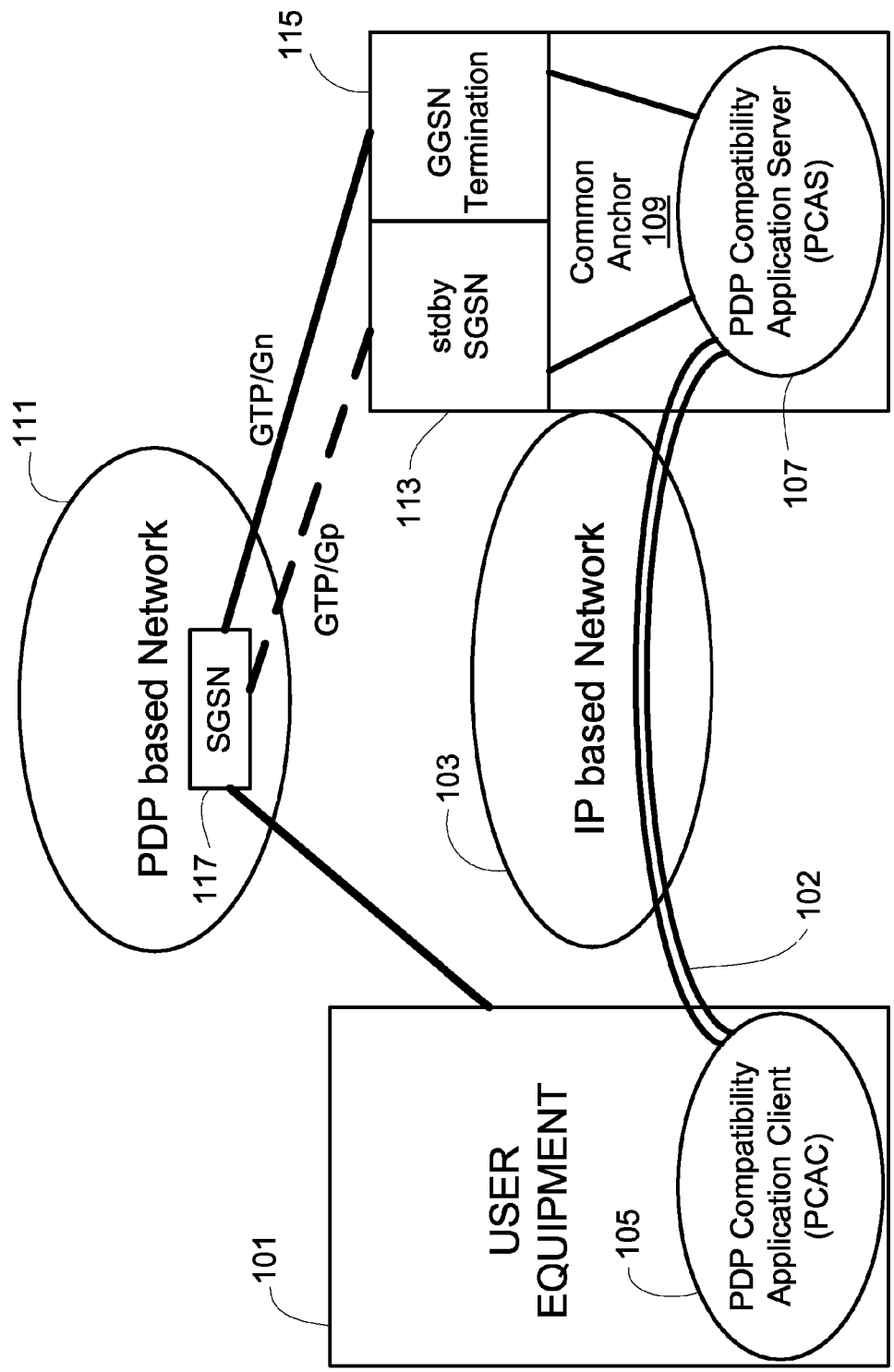
FIG. 1 illustrates an examplary embodiment of networks and user equipment connections according to the present invention.

Various embodiments are now described with reference to the drawings, wherein like reference numerals are used to refer to like elements throughout. In the following description, for purposes of explanation, numerous specific details are set forth in order to provide a thorough understanding of one or more embodiments. However, it may be evident that such embodiment(s) may be practiced without these specific details. In other instances, well-known structures and devices are shown in block diagram form in order to facilitate the description of one or more embodiments.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). General Packet Radio Service (GPRS) is a technology designed for GSM networks. An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

In an embodiment, a purpose of the method and apparatus described herein is to provide compatibility between a system using Packet Data Protocol (PDP) contexts, and an Internet Protocol (IP) based system without PDP contexts. One use case is to enable smooth handovers, or session continuity, between the IP based system and the PDP context based system.

The mentioned IP based system may be a 3GPP System Architecture Evolution (SAE) system, an evolved 3GPP2 system, a Wimax system, a Flash-PFDM system, a Flarion system, an IEEE system or any other system not based on PDP contexts.

The mentioned PDP context based system may be a GPRS system, an UMTS packet switched system, a GERAN system or any other system utilizing PDP contexts.

For clarity, certain aspects of the techniques are described below for a 3GPP SAE system and a GPRS system, and SAE and GPRS terminologies are used in much of the description below.

The term PDP context is used as an example of a specific bearer through the system. The idea covers also other bearer based systems other than systems based on PDP contexts, like systems based on Point-to-Point Protocol (PPP) connection, bearer or any other layer 2 or layer 3 bearer.

The terms GPRS style system applies to any system with bearer based transport over the access interface.

The terms User Equipment (UE), mobile, mobile device and similar refer to the end user device used to access at least one of the mentioned systems. The access can be over radio, wireless or wired interface.

In an embodiment, the problem to be solved is to enable fast inter system switching between a PDP based system and an IP based system. Without specific arrangements, setting up PDP contexts after the switch to a PDP based system, takes far too much time to achieve any smoothness in the inter system change. The reason is that the PDP information or any other bearer information is not natively kept up to date when the mobile is connecting via the IP based system. Specific arrangements, proposed here, are described below.

The description below uses an IP based 3GPP SAE as the example of the IP based system, but it would be applicable also to the evolved 3GPP2 system, WiMax, Flash OFDM, IEEE system or any other system not having PDP contexts. The system used as an example of PDP context based system is the 3GPP GPRS system, but the description is applicable to any other system based on bearer transport.

In an embodiment, one aspect is to maintain PDP contexts even when connected via the IP based system. The PDP contexts are established and managed through a transparent tunnel through the IP based system so that the PDP context information is readily available both at the mobile device and at a core network node in the system, in order to provide smooth handover to a PDP context based system (like GPRS).

With reference now to FIG. 1, in an aspect, an IP based client-server application maintains a proper set of PDP contexts while a User Equipment (UE) 101, or mobile, is connected via an IP tunnel 102 through the IP based system 103. The application client 105 resides at the mobile 101 and the application server 107 resides within the network at a common anchor point 109 between the IP based system and a PDP context based system 111 (such as, e.g., GPRS). The application monitors a set of services that the mobile is using via the IP based system and establishes PDP contexts that would be required to carry the same set of services through a GPRS system. These PDP contexts are kept up to date both at the mobile and at the network server, but they are otherwise kept on hold. When a handover to GPRS is required the PDP contexts are moved to the PDP context termination points: the mobile protocol stack, a "standby SGSN" function 113 at the IP based system, and a GGSN (Gateway GPRS Support Node) Termination 115 also at the IP based system. For the GPRS system the "standby SGSN" function emulates a conventional SGSN (Serving GPRS Support Node) for inter SGSN procedures according the 3GPP specification document TS 23.060, and the GGSN Termination emulates a conventional GGSN.

The SGSN in the PDP based network communicates with the "GGSN Termination" at the IP based system using a GPRS Tunneling Protocol (GTP) over a standard Gn interface (depicted as GTP/Gn in FIG. 1).

The SGSN in the PDP based network communicates with the "standby SGSN" at the IP based system using a GTP over a standard Gp interface (depicted as GTP/Gp in FIG. 1).

Whatever services are utilized for the mobile device through the IP based system, (on hold) PDP contexts capable of supporting a similar service set are maintained at the UE and the node managing the PDP contexts on the network side. When the service set through the IP based system is changed, necessary modifications (if any) to the (on hold) PDP context set are executed. The IP based system itself is unaware of the maintained on hold PDP contexts at the mobile and at the tunnel endpoint in the network.

Each element shown in FIG. 1 is hereafter described in more detail.

GGSN Termination: This is the function within the IP based system where connections via GPRS system are terminated. From a GPRS point of view, the "GGSN Termination" acts as a regular GGSN of a GPRS system.

Standby SGSN: This is the function within the IP based system which mimics a SGSN function of the IP based system. From a GPRS point of view the "Stdby SGSN" acts as a regular SGSN of a GPRS system.

PDP Compatibility Application: This is an IP based application that is used to manage PDP contexts when the mobile is connected via the IP based system. The application contains signaling between the "PDP Compatibility Application Client" (PCAC) at the UE and the "PDP Compatibility Application Server" (PCAS) at the IP based system to transparently maintain a suitable set off PDP contexts between the UE and the System to help a possible inter system switch.

When the UE stays connected through the IP based system, the PDP context information is juts kept up to date, otherwise it is kept on hold for a potential inter system change.

The communication between PCAS and PCAC is executed by exchange of GPRS SM and MM type of messages over an IP tunnel between the client and server. The IP tunnel is carried over the IP based SAE system.

PDP Compatibility Application Server (PCAS): This is the server at the IP based system managing the PDP context information on the network side. The PCAS communicates over the IP based tunnel with the PCAC at the UE. The PCAS also communicates with the IP based system network functions "Standby SGSN" and "GGSN Termination" to keep these three entities synchronized.

PDP Compatibility Application Client (PCAC): This the client on the UE side maintaining the PDP context information while the UE is connected through the IP based system. When the UE stays connected through the IP based system, the PDP context information is juts kept up to date, otherwise it is kept on hold for a potential inter system change. At inter system change the PD information is moved from the real PDP context termination point at the UE Switching from IP Based System to GPRS When a switch/handover from IP based system to the PDP based system is to be initiated, then the on hold PDP context information from the "PDP Compatibility Application Client" is copied to the true to be activated PDP context termination point at the Mobile (UE). Similarly the PDP context information from the "PDP Compatibility Application Server" is copied to the true to be activated PDP context termination point within the network (GGSN). Similarly PDP context information is made available into a place which looks like SGSN ("stdby SGSN") from the PDP based system (e.g. GPRS) point of view.

During the handover, if required, the target SGSN of the PDP based system communicates with the "stdby source SGSN" as it would communicate with a real source SGSN in a handover within the PDP based system. The "GGSN termination" of the IP based system behaves as GGSN of the target GPRS system.

Switching from GPRS to IP Based System

When the mobile is connected through a GPRS system the connection is still routed through the "GGSN Termination" at the IP based system. Based on the PDP contexts established for the user through the GPRS system, the IP based system may pre-establish/establish capabilities within the IP based system to transport a similar service set through the IP based system. This may include distribution or preparation of appropriate IP QoS policies to appropriate nodes within IP based system. If necessary, a tunnel through the GPRS connection may be established to prepare/establish necessary IP based contexts at the UE.

Procedures when UE is within GPRS

The UE and the GPRS specific parts of the system should behave as specified for GPRS system, except for the exceptions discussed in this document.

Procedures when UE is within IP Based SAE

When UE is connected to the system via the IP based SAE the PDP context information is not needed for the purposes of SAE transport. The PDP context information must however be kept up to date to be ready for a handover to a PDP context based system (like GPRS). To keep the PDP context information up to date the PCAC and PCAS exchange application level signaling similar in contents to that specified for GPRS between UE and SGSN to keep the PDP context information up to date.

The information to be exchanged can be derived from TS 23.060 by replacing the UE with the PCAC and the underlying GPRS transport by an IP tunnel through the IP based system.

The PDP states are stored in the PCAC at UE and PCAS at IP based system and taken into use when a handover or switch to GPRS is about to happen.

The PDP context information at PCAS at PCAC should always be kept at such a state that the existence of similar type of PDP contexts over the GPRS would be able to carry the set of IP flows moved to be transported over GPRS system in the possible event of inter system handover.

Inter System Procedures

The procedures between IP based system and GPRS based system Procedures are similar to those described in GPRS specifications, e.g. 3GPP TS 23.060.

Figure 2:
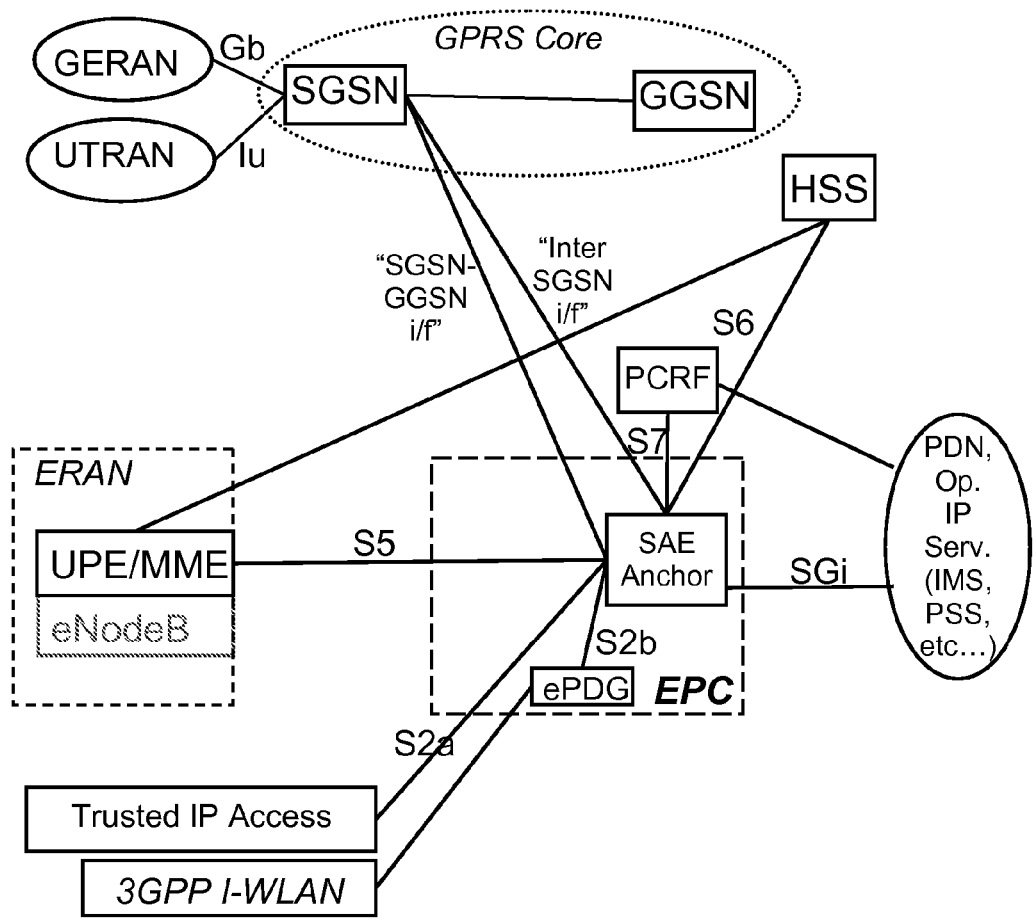
FIG. 2 illustrates an examplary embodiment of non-roaming architecture for an IP based SAE system.
Figure 3:
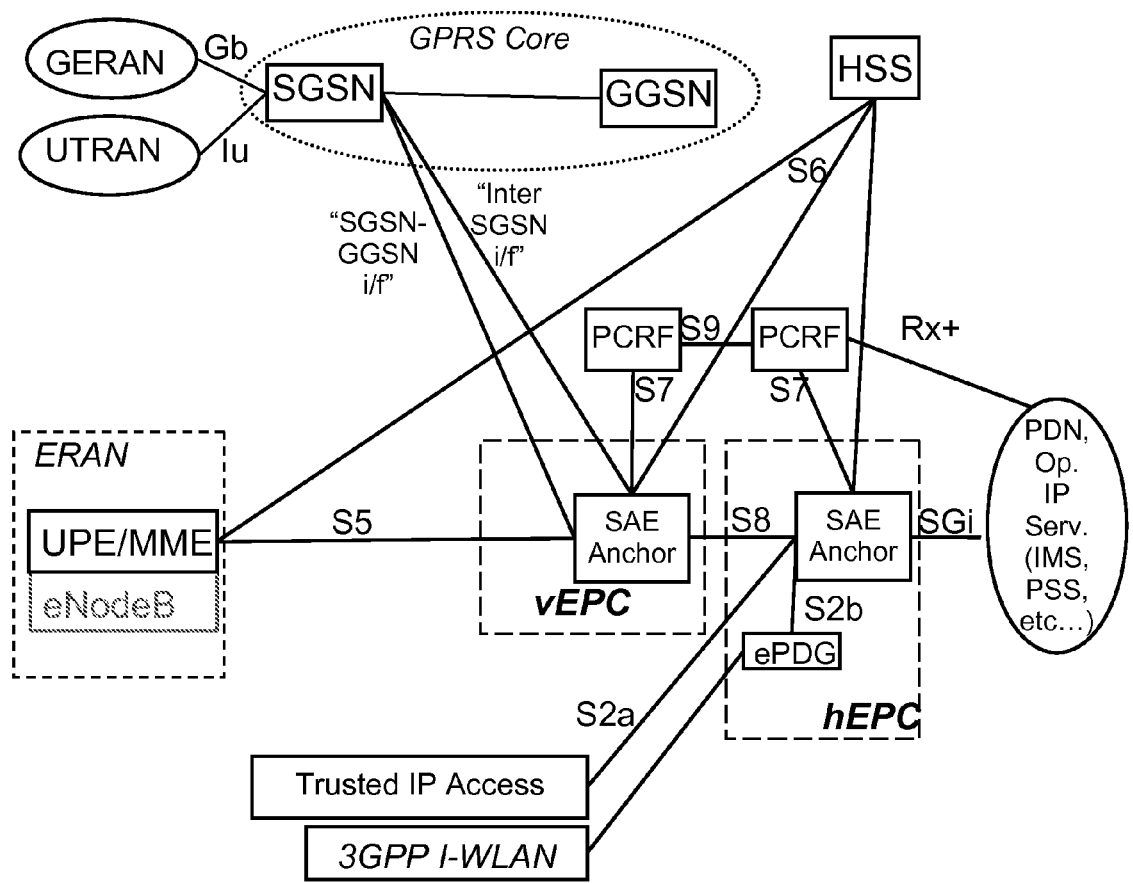
FIG. 3 illustrates an examplary embodiment of roaming architecture for an IP based SAE system.

Regarding the switch from IP based system to GPRS system, the procedures in TS 23.060 should be interpreted as follows:

the "old SGSN" is represented by the "Stdby SGSN" function (within SAE anchor) of the IP based system.
GGSN is represented by the "GGSN Termination" function (within SAE anchor) of the IP based system
Procedures within the source GPRS system are replaced by the appropriate procedures within the IP based system Regarding the switch from GPRS based system to IP based system, the procedures in TS 23.060 should be interpreted as follows:

The "new SGSN" is represented by the "Stdby SGSN" function (within SAE anchor) of the IP based system
GGSN is represented by the "GGSN Termination" function (within SAE anchor) of the IP based system
Procedures within the target GPRS system are replaced by the appropriate procedures within the IP based system With reference now to FIG. 2 and FIG. 3, there are depicted examplary architecture diagrams. FIG. 2 illustrates an examplary non-roaming architecture for an IP based SAE system where the above-described type of SAE-GPRS interoperability could be applied. In this example PCAS is located at the SAE Anchor within an Evolved Packet Core (EPC). FIG. 3 illustrates an examplary roaming architecture for an IP based SAE system where the above-described type of SAE-GPRS interoperability could be applied.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method for system interoperability in communication networks, comprising:
    monitoring activity including a set of services currently being used by a mobile station within a first communication system;
    establishing context information related to the monitored activity of the mobile station within the first communication system, wherein said context information can be used in a second communication system but is incompatible with contexts within the first communication system;
    keeping said context information up to date;
    keeping said context information on hold while the mobile station is connected to the first communication system;
    periodically transmitting said on hold context information to the mobile station; and
    putting to use said context information when the mobile station switches to the second communication system, wherein said second communication system is not based on the same context as the first communication system.

2. The method of claim 1, wherein said first communication system is a non context based system.

3. The method of claim 2, wherein said first communication system is an Internet Protocol (IP) based communication system and said second communication system is a Packet Data Protocol (PDP) context based communication system.

4. The method of claim 3, wherein said IP based communication system is a System Architecture Evolution (SAE) communication system and said PDP context based communication system is a General Packet Radio Services (GPRS) system.

5. The method of claim 1, wherein said context information is maintained by a client-server application residing at the mobile station and at a common anchor point between the first and second communication systems; and said context information is tunneled through the first communication system between an application client residing at the mobile station and an application server residing at the common anchor point.

6. An apparatus for system interoperability in communication networks, comprising:
    means for monitoring activity including a set of services currently being used by a mobile station within a first communication system;
    means for establishing context information related to the monitored activity of the mobile station within the first communication system, wherein said context information can be used in a second communication system but is incompatible with contexts within the first communication system;
    means for keeping said context information up to date;
    means for keeping said context information on hold while the mobile station is connected to the first communication system;
    means for periodically transmitting said on hold context information to the mobile station; and
    means for putting to use said context information when the mobile station switches to the second communication system, wherein said second communication system is not based on the same context as the first communication system.

7. The apparatus of claim 6, wherein said first communication system is a non context based system.

8. The apparatus of claim 7, wherein said first communication system is an Internet Protocol (IP) based communication system and said second communication system is a Packet Data Protocol (PDP) context based communication system.

9. The apparatus of claim 8, wherein said IP based communication system is a System Architecture Evolution (SAE) communication system and said PDP context based communication system is a General Packet Radio Services (GPRS) system.

10. The apparatus of claim 6, wherein said context information is maintained by a client-server application residing at the mobile station and at a common anchor point between the first and second communication systems; and said context information is tunneled through the first communication system between an application client residing at the mobile station and an application server residing at the common anchor point.

11. A non-transitory machine-readable medium comprising instructions which, when executed by a machine, cause the machine to perform operations including:
    monitoring activity including a set of services currently being used by a mobile station within a first communication system;
    establishing context information related to the monitored activity of the mobile station within the first communication system, wherein said context information can be used in a second communication system but is incompatible with contexts within the first communication system;
    keeping said context information up to date;
    keeping said context information on hold while the mobile station is connected to the first communication system;
    periodically transmitting said on hold context information to the mobile station; and
    putting to use said context information when the mobile station switches to the second communication system, wherein said second communication system is not based on the same context as the first communication system.

12. The machine-readable medium of claim 11, wherein said first communication system is a non context based system.

13. The machine-readable medium of claim 11, wherein said first communication system is an Internet Protocol (IP) based communication system and said second communication system is a Packet Data Protocol (PDP) context based communication system.

14. The machine-readable medium of claim 11, wherein said IP based communication system is a System Architecture Evolution (SAE) communication system and said PDP context based communication system is a General Packet Radio Services (GPRS) system.

15. The machine-readable medium of claim 11, wherein said context information is maintained by a client-server application residing at the mobile station and at a common anchor point between the first and second communication systems; and said context information is tunneled through the first communication system between an application client residing at the mobile station and an application server residing at the common anchor point.

16. A mobile station for communication in a wireless communication system, the mobile station comprising:
    a processor, configured for establishing context information related to a current activity, including a set of services currently being used, of the mobile station within a first communication system, wherein said first communication system is not a context based system; keeping said context information up to date by receiving periodic transmissions from the first communication system; keeping said context information on hold while the mobile station is connected to the first communication system; and putting to use said context information when the mobile station switches to a second communication system, wherein said second communication system is a context based communication system; and
    a memory coupled to the processor for storing data.

17. The mobile station of claim 16, wherein said first communication system is an Internet Protocol (IP) based communication system and said second communication system is a Packet Data Protocol (PDP) context based communication system.

18. The mobile station of claim 16, wherein said IP based communication system is a System Architecture Evolution (SAE) communication system and said PDP context based communication system is a General Packet Radio Services (GPRS) system.

19. The mobile station of claim 16, wherein said context information is maintained by a client-server application residing at the mobile station and at a common anchor point between the first and second communication systems.

20. The mobile station of claim 16, wherein said context information is tunneled through the first communication system between an application client residing at the mobile station and an application server residing at the common anchor point.

21. A common anchor for providing system interoperability in a wireless communication system, the common anchor comprising:
    means for monitoring activity including a set of services currently being used by a mobile station within a first communication system;
    means for establishing context information related to the monitored activity of the mobile station within the first communication system, wherein said first communication system is not a context based system;
    means for keeping said context information up to date;
    means for keeping said context information on hold while the mobile station is connected to the first communication system;
    means for periodically transmitting said on hold context information to the mobile station; and
    means for putting to use said context information when the mobile station switches to a second communication system, wherein said second communication system is a context based communication system.

22. The common anchor of claim 21, further comprising:
    a Packet Data Protocol (PDP) Compatibility Application Server (PCAS) module;
    a standby SGSN function module; and
    a GGSN termination function module.

23. The common anchor of claim 22, wherein the PCAS is in communication through an IP tunnel via an IP based network with a PDP Compatibility Application Client (PCAC) module residing in a mobile station.

24. The common anchor of claim 23, wherein the PCAS is in communication with the standby SGSN function module and with the GGSN termination function module.

25. The common anchor of claim 24, wherein the standby SGSN function module and the GGSN termination function module emulate conventional SGSN and GGSN nodes, and communicate with a Serving GPRS Support Node in a PDP based network using a conventional GPRS Tunneling Protocol over conventional interfaces.

* * * * *